June 5, 1934.  H. VAN DEEST  1,961,653
SLIDABLE SEAT
Filed March 21, 1932  2 Sheets-Sheet 1
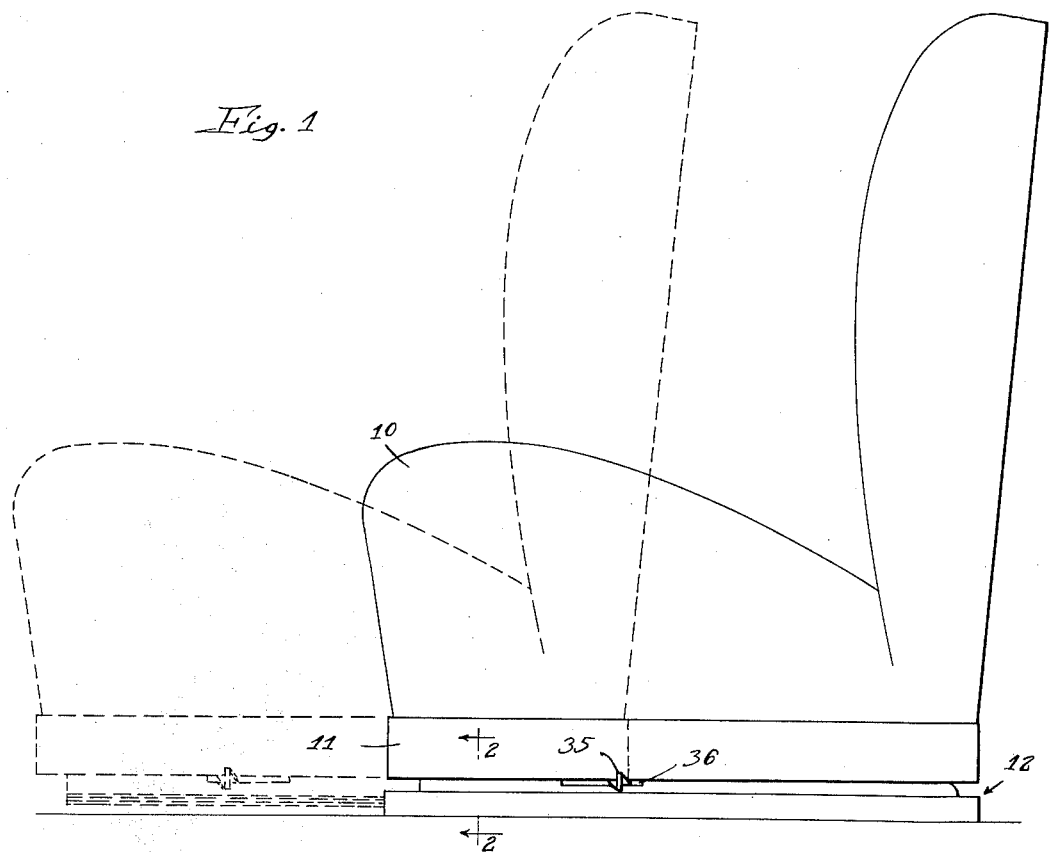
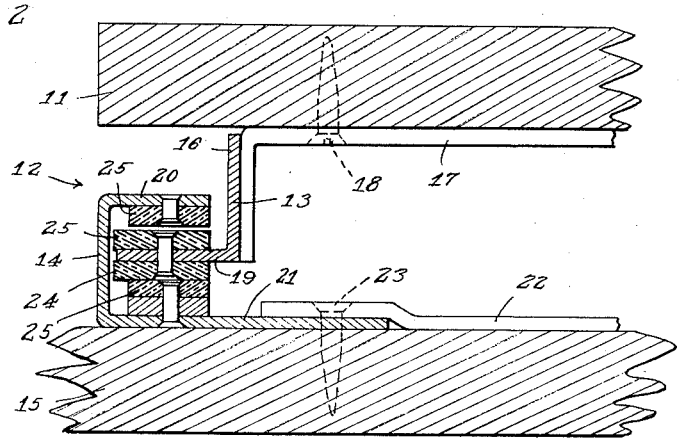

June 5, 1934.　　　　H. VAN DEEST　　　　1,961,653
SLIDABLE SEAT
Filed March 21, 1932　　　2 Sheets-Sheet 2
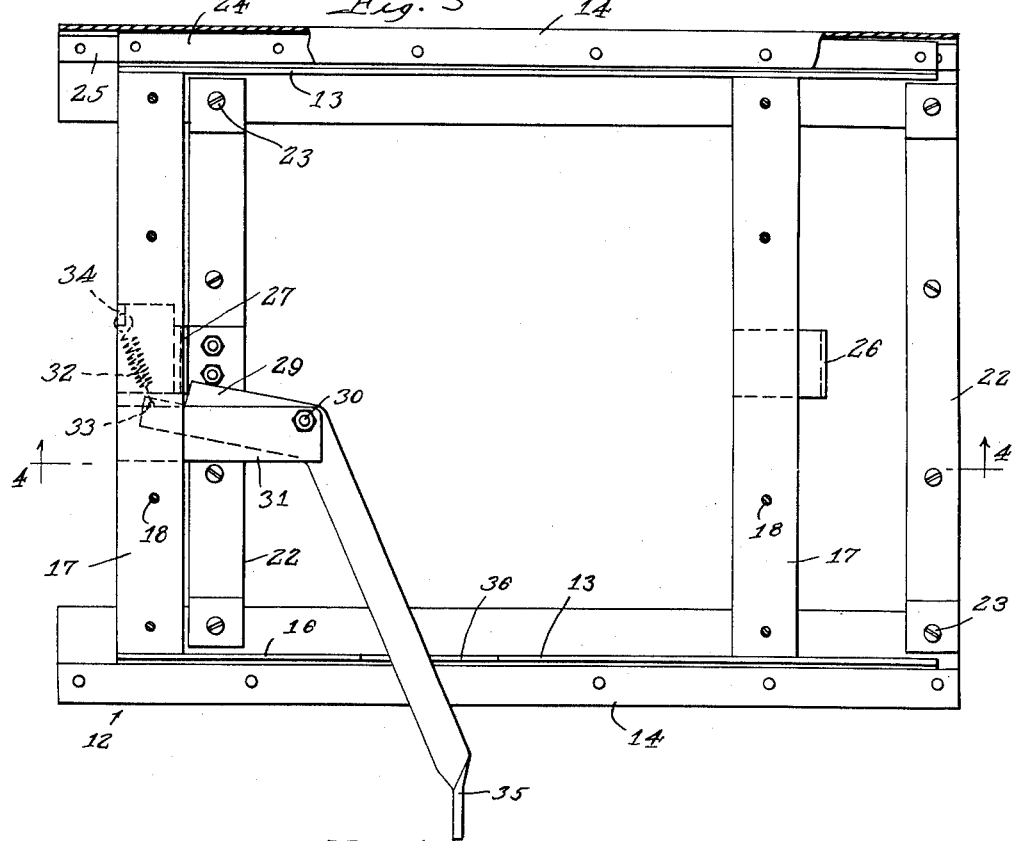
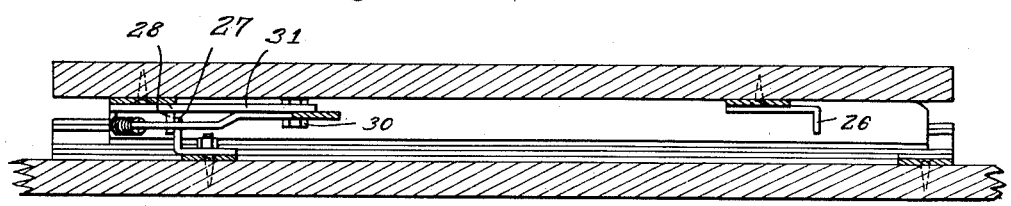
Inventor
Henry Van Deest
By
Wilson, Dowell, McCanna & Rehm
Attys.

Patented June 5, 1934

1,961,653

UNITED STATES PATENT OFFICE 1,961,653

SLIDABLE SEAT

Henry Van Deest, Freeport, Ill., assignor to Henney Motor Company, Freeport, Ill., a corporation of Delaware Application March 21, 1932, Serial No. 600,180

2 Claims. (Cl. 155—14)

This invention relates to a slidable seat adapted for a variety of purposes, but especially designed and intended for use in vehicles. For example, seats of this type have been used in hearses where it is desired to have the two seats slidable forward to provide clearance for the table movable into and out of the hearse for side servicing. Furthermore, such seats have also been used in automobiles, especially in the coach type as a matter of convenience for rear seat passengers leaving or entering the car.

The principal object of my invention is to provide a sliding seat sub-structure of simple and economical construction, and one which is thoroughly practical for the purpose intended. A special feature of my invention is the simple and effective means for locking the seat in its normal position and in such a way that very little effort is required to unlock it when it is to be moved.

The invention is illustrated in the accompanying drawings, in which—

Figure 1 is a side view of a slidable seat embodying my invention;

Fig. 2 is a sectional detail on an enlarged scale taken on the line 2—2 of Figure 1;

Fig. 3 is a plan view of the sub-structure of the seat, partly broken away to better illustrate the slide construction, and Fig. 4 is a longitudinal section on the line 4—4 of Fig. 3.

The same reference numerals are applied to corresponding parts throughout the views.

The slidable seat, designated generally by the reference numeral 10, has the bottom 11 thereof supported on the slide structure of my invention appearing at 12, to permit movement forwardly from a normal position, as indicated in dotted lines in Figure 1. The slide structure 12 is the sub-structure shown in Fig. 3 and, generally speaking, comprises a pair of slides 13 operable in guides 14 resting on the floor 15. The slides 13 are of angular cross-section, as clearly appears in Fig. 2, and have the vertical flanges 16 thereof welded to cross members 17 suitably secured to the seat bottom 11, as at 18. The horizontal flanges 19 of the slides project outwardly into the guides 14 which, as clearly appears in Fig. 2, are channel-shaped in cross-section so as to provide a top flange 20 over the flange 19 and a bottom flange 21 therebeneath. The flanges 21 of the guides are held in a predetermined spaced relation by cross members 22 secured with the guides to the floor 15, as at 23. Now, I have riveted or otherwise suitably secured strips 24 of a material known as formica to the top and bottom of the flange 19 of each of the slides 13, and have likewise riveted or otherwise suitably secured strips 25 of the same material to the bottom of flange 20 and top of flange 21 of each of the guides 14 for sliding contact with the strips 24. This material is a condensation product of phenol and formaldehyde, or the equivalent, and its characteristics are such that it is especially suited for the purpose of making a seat slide easily. The precise reason for this is not known, but examination of the material shows it has a hard, smooth, and glossy, one might say slippery, surface. It has been suggested that these surface characteristics may be attributed to the fact that mica flour is used as a filler in the manufacture of formica, which might account for the material requiring no lubricant applied thereto, the lubricating medium being in the material itself. At any rate, the seat is slidable with greater ease and more quietly than where there is metal to metal contact between the slide and its guide, or even metal to formica contact. The fact that no lubricant is required means that the slide structure requires no attention when the seat is in service, and the seat always operates smoothly and quietly and with the same ease. Furthermore, the total absence of any lubricant means freedom from danger of soiling the upholstering or floor covering, or one's clothing. In passing, it may also be pointed out that the slides and guides have such a slight clearance with respect to one another, measured vertically and laterally, as best appears in Fig. 2, that there is no opportunity for the seat to rattle. That is to say, there is no evidence of looseness in the seat mounting such as there was in most of the roller and track structures. The sliding of the parts on one another also eliminates most of the other objections that went with the use of rollers operating on tracks.

The seat could, of course, be slidable in either direction. In the present case, it is intended to slide forwardly from the normal position, as appears in Figure 1. Forward movement is limited by engagement of a downwardly projecting lug 26 on the rear cross member 17 on the bottom of the seat, with an upwardly projecting lug 27 on the front cross member 22 on the floor. Rearward movement is limited by engagement of a downwardly projecting lug 28 on the front member 17 with the upwardly projecting lug 27. A latch 29, pivoted as at 30 on a bracket 31 reaching rearwardly from the front cross member 17 on the bottom of the seat, is arranged to engage behind the lug 27 when the lug 28 comes into abutment with the front of the lug, whereby to lock the seat against movement from normal position. A coiled tension spring 32 is attached to the latch 29 at 33 and to the front cross member 17 at 34, whereby normally to urge the latch 29 in a clockwise direction as viewed in Fig. 3 toward engagement behind the lug 27. A handle 35 is provided for moving the latch 29 by hand in a counterclockwise direction against the action of the spring, a slot being cut in the vertical flange 16 of the one slide 13 to permit the handle to project from the side of the seat for convenient manipulation. It is, of course, readily apparent that the seat can be unlocked for forward movement by simply moving the handle 35 to the right enough to make the latch 29 move clear of the lug 27. In returning the seat, the latch 29, which is at the time held in engagement with the side of the lug 28 under the action of the spring 32, will ride over the side of the lug 27 and come into locking position behind it in a manner thought to be clear from the foregoing description.

It is believed the foregoing description conveys a good understanding of all of the objects and advantages of my invention. The appended claims have been drawn so as to cover all legitimate modifications and adaptations.

I claim:

1. An adjustable seat comprising a stationary frame including a cross-member having an upwardly projecting lug, a movable frame slidable on the stationary frame, the movable frame having cross-members at the front and rear ends thereof each provided with a downwardly projecting lug for engagement respectively with the front and rear faces of the upwardly projecting lug, whereby to limit the travel of the movable frame, the movable frame having a seat carried thereby, and means for locking the movable frame so as to hold the seat in an adjusted position, comprising a bell crank latch pivoted on a vertical axis on the front cross-member of the movable frame so that one end projects from the side of the seat for manual operation back and forth in a horizontal plane, and spring means normally urging the other end of said latch toward engagement with the side of the downwardly projecting front lug on the front cross-member, the last mentioned end of the latch having a shoulder arranged to engage the rear face of the upwardly projecting lug when the downwardly projecting front lug engages the front face of the upwardly projecting lug, whereby to releasably hold the movable frame against movement in either direction.

2. An adjustable seat comprising a stationary frame including a cross-member intermediate the front and rear ends having an upwardly projecting lug, a movable frame slidable on the stationary frame over said cross-member and having cross-members at the front and rear ends thereof, the movable cross-members having downwardly projecting lugs for engagement with the front and rear faces of the upwardly projecting lug on the stationary cross-member, whereby to limit the travel of the movable frame, the movable frame carrying a seat, and means for locking the movable frame so as to lock the seat in a certain position with one of the downwardly projecting lugs in engagement with the upwardly projecting lug, said means comprising a bell crank latch pivoted on the movable frame on a vertical axis so that one end projects from the side of the seat for manual operation back and forth in a horizontal plane, and spring means normally urging the other end of said latch toward engagement with the side of the last mentioned downwardly projecting lug, the last mentioned end of the latch having a shoulder arranged to engage the upwardly projecting lug on the opposite side from the downwardly projecting lug, whereby to releasably lock the movable frame.

HENRY VAN DEEST.